Jan. 12, 1926. Re. 16,252

R. M. CATLIN

METHOD AND APPARATUS FOR DISTILLATION OF CARBONACEOUS MATERIAL

Original Filed August 17, 1921 2 Sheets-Sheet 1

Inventor:
Robert M. Catlin
by his Atty's:
Philip Sumner Reed Kennedy

Jan. 12, 1926. Re. 16,252

R. M. CATLIN

METHOD AND APPARATUS FOR DISTILLATION OF CARBONACEOUS MATERIAL

Original Filed August 17, 1921 2 Sheets-Sheet 2

Inventor
Robert M. Catlin
by his Attys:
Philip Sawyer Rice & Kennedy

Reissued Jan. 12, 1926. Re. 16,252

UNITED STATES PATENT OFFICE.

ROBERT M. CATLIN, OF FRANKLIN, NEW JERSEY, ASSIGNOR TO CATLIN SHALE PRODUCTS COMPANY, OF NEW YORK, N. Y., A CORPORATION OF DELAWARE.

METHOD AND APPARATUS FOR DISTILLATION OF CARBONACEOUS MATERIAL.

Original No. 1,509,667, dated September 23, 1924, Serial No. 492,885, filed August 17, 1921. Application for reissue filed July 18, 1925. Serial No. 44,606.

*To all whom it may concern:*

Be it known that I, ROBERT M. CATLIN, a citizen of the United States, residing at Franklin, county of Sussex, and State of New Jersey, have invented certain new and useful Improvements in a Method and Apparatus for Distillation of Carbonaceous Material, fully described and represented in the following specification and the accompanying drawings, forming a part of the same.

This invention relates to methods of and apparatus for distillation of carbonaceous material and particularly for the distillation of shale.

The principal object of the invention is to provide a process by which the volatilizable ingredients of the carbonaceous material may be distilled off without injurious decomposition and with the minimum amount of combustion of such ingredients, the heat for the distillation being furnished by the combustion of a part or all of the fixed carbon remaining in the material after the volatilizable ingredients have been distilled off. The process and apparatus will be more particularly explained hereinafter in connection with the accompanying drawings illustrating the preferred form of apparatus embodying the invention, particularly suitable for treating shale.

Figure 1:
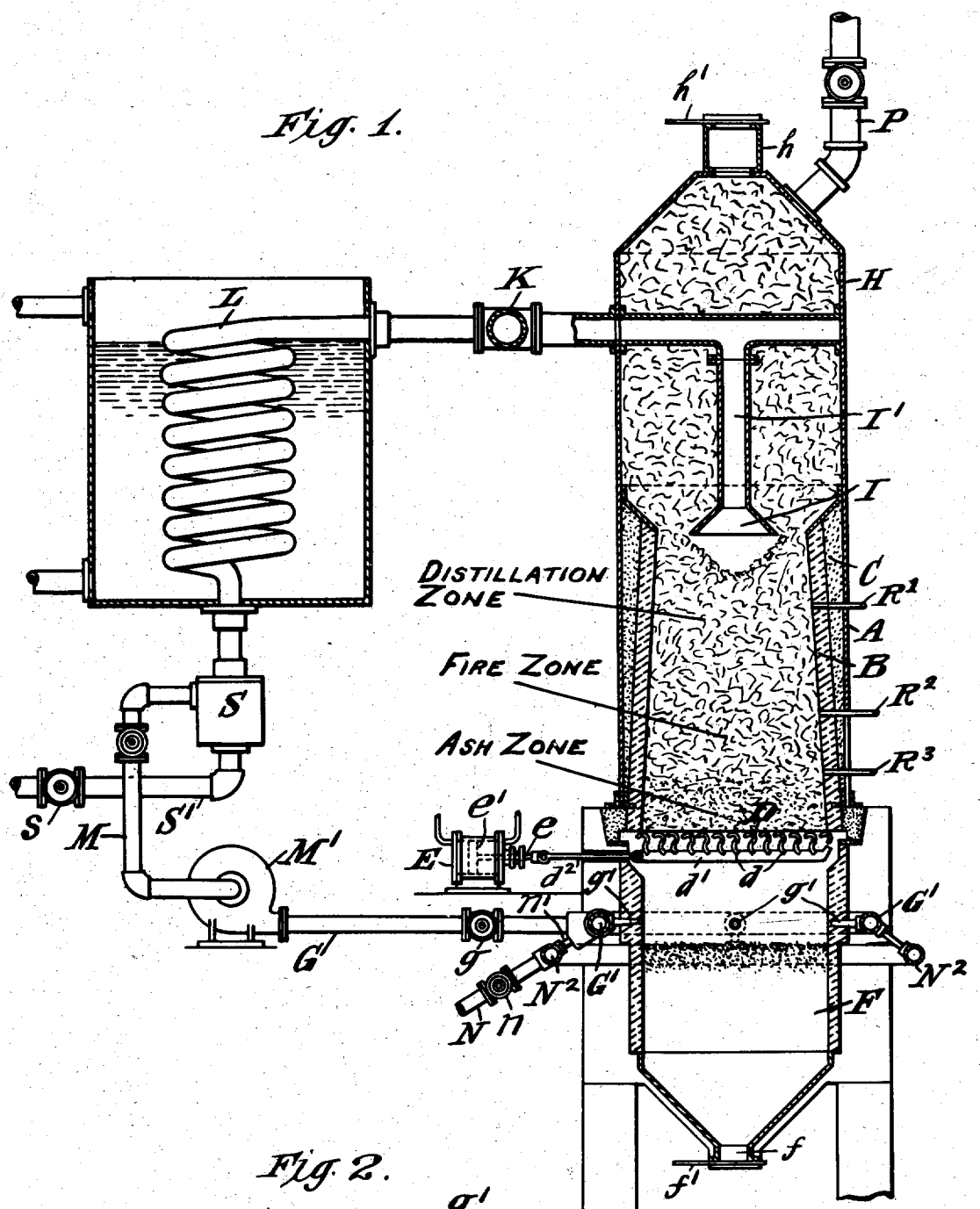
Figure 1 is a diagrammatic view of the apparatus.

Referring to the drawings, A indicates the outer wall or shell of an apparatus resembling a gas producer, but embodying some special features as hereinafter described.

The inner wall or lining B of this producer is formed of suitable refractory material, such, for example, as fire brick, the interior surface of this lining B sloping outward and downward so as to form a chamber which in the example shown is frustoconical. Between the lining B and the shell A there may be a space filled with suitable heating insulating material, as, for example, loam, indicated at C.

In order to provide for continuous operation, suitable means is provided for continuously feeding broken carbonaceous material, for example, shale, to the producer chamber without admission of air thereto, as will be more fully explained hereinafter. Also there is provided a special means for leading off or withdrawing gases and vapors from the top of the producer chamber, and means for removing the solids from the bottom of the producer chamber at any desired or required intervals, also without any appreciable admission of air.

For the combustion of the fixed carbon an air-gas mixture is supplied to the producer chamber by controllable means whereby the composition of the said mixture, both as to quality and proportions, may be regulated.

The means for removing the solids from the bottom of the producer chamber comprises a suitable shaking grate located at the bottom of the producer chamber and arranged to be operated from the exterior of the producer in any suitable way. This grate is indicated at D and as shown comprises a plurality of rocking grate bars $d$ pivotally connected to a link $d'$ which is coupled by a connecting rod $d^2$ to the piston rod $e$ of a ram E, so that by supplying a suitable reciprocatory motive fluid to the ram, the piston $e'$ of the latter may be reciprocated to shake the grate D.

Below the grate is arranged a large ash-pit F which will receive and retain the ash or solids falling from the producer chamber through the grate. This ash pit F may have a hopper bottom, as shown, with a discharge-opening $f$ arranged to be controlled by a suitable gate-mechanism, which in the example illustrated is a sliding or swinging gate $f'$. When this gate is slid or swung back the ashes will be discharged from the ashpit. By the use of a gate such as shown it is possible to close the discharge opening before all the solids are discharged from the ash-pit, thus retaining some of the solids to serve as a seal against the admission of air to the producer through the discharge opening. However, as the gate may be closed quickly and immediately after the discharge of all the solids from the ash-pit, the amount of air admitted during the emptying of this ash-pit may be rendered negligible.

Figure 2:
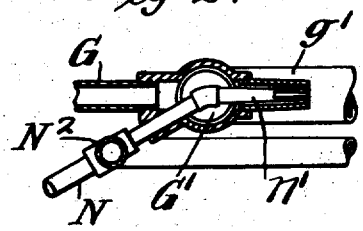
Figure 2 is a detail sectional vew.

At the ash-pit, at a place above the highest level to which the ashes or solids are permitted to accumulate, there are arranged suitable blast inlets for the air mixture. In the example illustrated in the drawings, the gas and air are introduced separately to the plenum or space below the grates, as, for example, by providing concentrically arranged pipes for air and gas, as indicated in Fig. 2, and more fully described hereinafter. This avoids the possibility of forming an explosive mixture in the pipes themselves.

The means for feeding the broken shale or similar material to the producer chamber comprises a large magazine mounted upon the producer, as indicated at H. This magazine is advantageously proportioned so as to hold enough material for a run of 24 hours or longer. It has a conical or hopper-like bottom, as shown, the opening in the bottom having a diameter substantially the same as the inner diameter of the top of the producer chamber.

The top of the magazine may be as desired, but preferably is conical as shown, and is provided with a dome *h*, closed at the top by a suitable closure device, such, for example, as the sliding gate *h'* or hinged door sealed with clay.

For the purpose of continuously leading off the gases and vapors from the produced chamber, and at the same time not interfering with the continuous feed of the broken shale or other similar material to said chamber, there is provided a bell I, of conical form, having a bottom opening of such diameter as to cover an appreciable part of the upper end of the producer chamber. In the example shown the diameter of the bell opening is more than half the diameter of the upper end of the producer chamber. The upper or outer surface of the bell forms a deflector to direct the material radially outward as it moves downward in the magazine H, thereby causing it to fall in an outward direction as it enters the upper end of the producer chamber. But since the hopper bottom of the magazine forces the material to discharge radially inward and discharges more material than does the bell, the resultant effect is to throw the coarser material more toward the center of the producer chamber. Since the larger pieces have a greater tendency to slide down the slope than the smaller pieces, they go further toward the center of the producer than the smaller ones, with the result that the center of the producer is charged with the larger lumps and the wall-portion of the charge is mostly made up of smaller lumps. As a result the gases and vapors can escape freely to the bell, I. The bell is connected to a riser pipe I' which most advantageously is carried some distance up through the center of the magazine so as to give off heat to the descending charge, and then is turned outward through the wall of the magazine and is connected to a main K which leads to a condenser L.

In the condenser L the vapors are condensed and the gases, consisting largely of nitrogen, but also containing some other constituents, such as $CO_2$ and perhaps some CO, are led back by a pipe M to the producer, reaching the same through the pipes G and G', a suitable suction being maintained by a fan M'.

Means is provided for mixing some air with the gases immediately at the respective inlets, as, for example, by providing an air-supply pipe N which conducts air from a suitable source as, for example, a fan (not shown) to a bustle pipe $N_2$ feeding air to nozzles *n'*, each concentrically arranged inside its nozzle *g'* of the gas-supplying system, as shown in Fig. 2.

The pipes M, N and G are provided with control valves as indicated at *n* and *g*, respectively. By means of these valves it is possible to control the proportions and total amount of air-gas mixture supplied to the producer.

In carrying out my process the producer is so run that an ash bed or zone is maintained just above the grate, as indicated in the drawings. Above this is a zone of combustion in which the fixed carbon of the shale or other carbonaceous material is burnt either wholly or to any lesser extent as may be desired. Generally it is unnecessary to burn all the fixed carbon from the material, since sufficient heat is obtained without the complete combustion of the carbon. The zone of combustion will be referred to hereinafter as the fire zone. Above it is the zone of distillation wherein all the volatile products of the carbonaceous material are distilled off by hot gases coming from the fire zone.

The downward travel of the material is controlled by the amount of ashes shaken through the grate, which of course depends upon the frequency of operation of the shaking mechanism. The relative depth of the ash zone also is determined by the shaking and by the rapidity of combustion.

The depth of the fire zone is determined by the rapidity of combustion, which can be regulated by the control of the supply of air-gas mixture and by the proportions of such mixture. The distillation zone receives its heat both by conduction through the lumps of material as well as from the hot gases arising from the fire zone. The apparatus is so run that the volatile products of the carbonaceous material will all be driven off before the material in its downward course reaches the top of the fire zone. That is to say, there should be a layer of material, containing fixed carbon but no volatile hydrocarbons, between the lower part of the distillation zone and the top of the fire zone.

Pyrometers $R_1$, $R_2$, $R_3$ may be located at different levels in the wall of the producer chamber, thus enabling the operator to control the operation in a suitable systematic manner. At S is a trap from which the condensed liquid is drawn through pipe S′, controlled by a valve *s*.

In the best operation of the apparatus a temperature of between 750° and 850° F, should be maintained in a zone terminating above the top of the fire zone, while the rate of downward movement of the material may well be such that it would take not less than about one hour and twenty minutes for the material to pass through this zone of approximately 800° F.

It is to be noted that the air-gas mixture should have enough, but no more than enough, air to bring about the combustion in the fire zone of the desired amount of fixed carbon, while the volume of diluting or inert gas should be enough to transport heat from the fire zone to the distillation zone so as to distill off all the volatilizable hydrocarbons and compounds at a place above the top of the fire zone.

Figure 3:
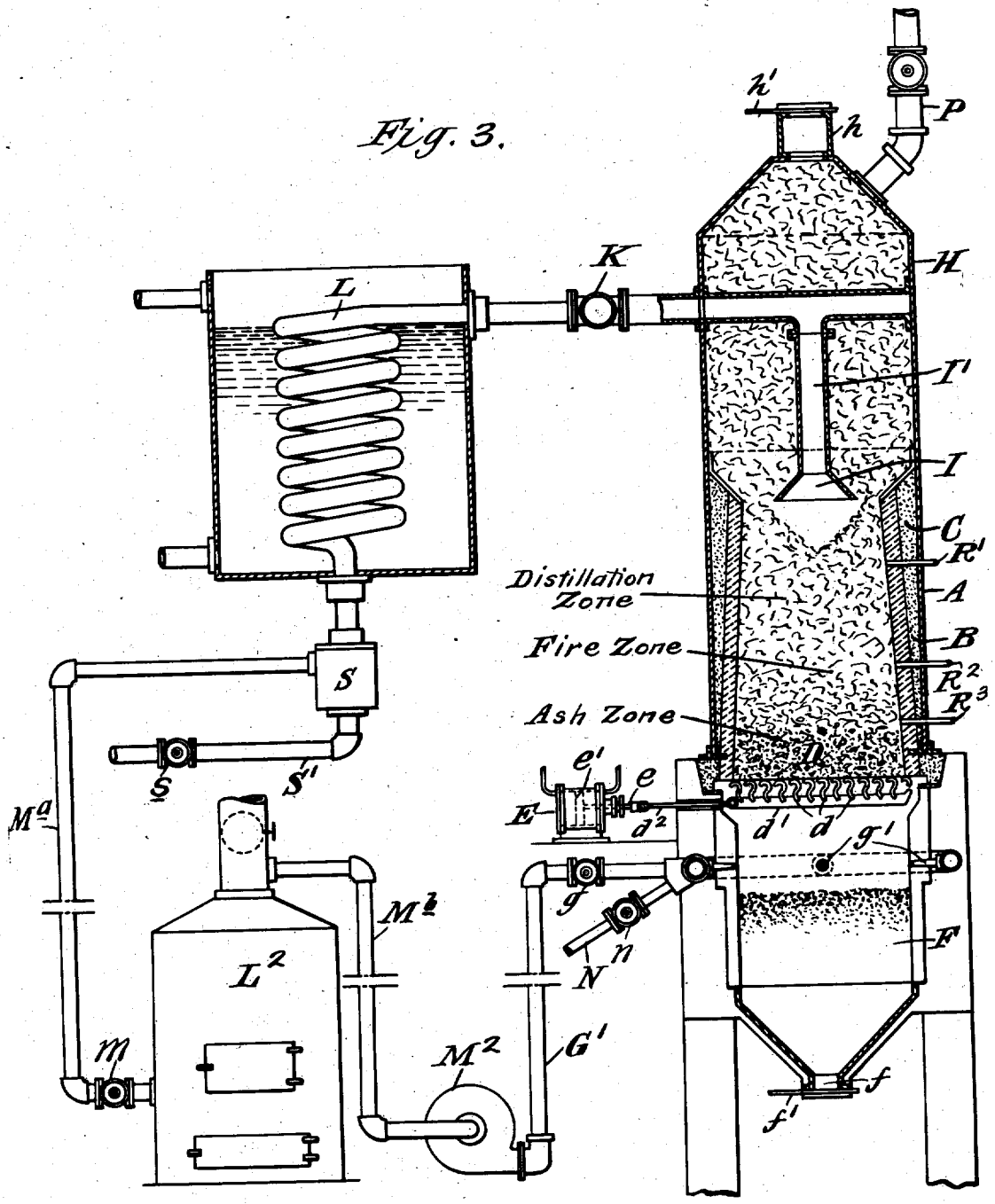
Figure 3 is a diagrammatic view of a modification of the apparatus.

Since any $CO_2$ in the diluent gases fed in with the air may be decomposed to CO by contact with incandescent carbon, it may be necessary, if the proportion of the CO in the gases coming from the condenser is relatively high, to burn the CO to $CO_2$ before introducing the air-gas mixture to the producer. This may be done by running the gases from the condenser through a furnace with some air. The resulting burnt gases may then be led to the producer. This will be clear from Fig. 3, which shows the same apparatus as in Fig. 1, with a furnace interpolated between the condenser and the gas producer. The furnace is indicated diagrammatically only at $L^2$ with the pipe $M^a$ leading from the condenser to it, and with the pipe $M^b$, fan $M^2$ and pipe $G^1$ for taking the burnt gases from the furnace to the gas producer.

Since the continuous supply of air to the apparatus and the combustion of the oxygen of such air will provide a surplus of nitrogen and $CO_2$, it will be necessary to vent some of the gases at intervals from the system. In order to do this, a vent pipe P is provided, at any suitable point. In the best embodiment of the system, the vent pipe is located at the upper end of the receptacle so that the hot gases will pass off through the broken material in the receptacle, thus serving to dry and preheat the material.

What I claim is:

1. The process of distilling carbonaceous material containing a volatilizable portion and a combustible solid portion, which comprises feeding such material in a descending column, maintaining a zone of combustion at the lower part of the column by supplying a preformed incombustible mixture of air and incombustible gas to the lower part of said combustion zone, regulating the quantity of said air-gas mixture to maintain a distillation zone above the combustion zone, regulating the proportions of said air-gas mixture to prevent combustion in said distillation zone, leading off the evolved gases and vapors from the column above the distillation zone, separately obtaining, from said evolved gases and vapors, the condensible portions thereof and also a supply of incombustible gas, and using said incombustible gas to form the incombustible air-gas mixture for subsequent distillation of carbonaceous material such as described.

2. The process of distilling carbonaceous material containing volatile material and a combustible solid, which consists in feeding such material in a descending column while maintaining a zone of combustion at the lower part of the column by supplying a preformed mixture of air diluted with inert gases, to the lower part of said combustion zone, regulating the amount of the air-gas mixture to maintain a distillation zone above the combustion zone and regulating the proportions of said mixture to prevent combustion in the distillation zone, leading off the gases and other volatilizable products from the upper part of the column, condensing the vapors from such volatilizable products and gases, burning the gases to render inert any non-inert products in in said gases, and using the burnt gases as a diluent for making the air-gas mixture supplied to the combustion zone.

3. The process of distilling carbonaceous material containing volatile material and a combustible solid, which consists in feeding such material in a descending column while maintaining a zone of combustion at the lower part of the column by supplying a preformed mixture of air diluted with inert gases, to the lower part of said combustion zone, regulating the amount of the air-gas mixture to maintain a distillation zone above the combustion zone and regulating the proportions of said mixture to prevent combustion in the distillation zone, leading off the gases and other volatilizable products from the upper part of the column, condensing the vapors from such volatilizable products and gases, burning the gases to convert any CO to $CO_2$, and using the burnt gases as a diluent for making the air-gas mixture supplied to the combustion zone.

4. The process of distilling shale containing a volatilizable portion and a combustible solid portion, which comprises feeding the shale in a descending column, maintaining a zone of combustion at the lower part of the column by supplying a preformed incombustible mixture of air and incombustible gas to the lower part of said combustion zone, regulating the quantity and proportions of said air-gas mixture to maintain a distillation zone above the combustion zone while preventing combustion in said distillation zone, leading off evolved gases and vapors, and condensing a liquid hydrocarbon product therefrom.

5. In an apparatus for distilling carbonaceous material, the combination with a gas producer having its walls sloping downwardly and outwardly, and a magazine for the material above the gas producer and having a hopper shaped bottom opening into the top of the gas producer, of a bell for leading off gases and vapors, said bell having an outward and downwardly sloping surface, said bell being located within the magazine and having its lower edge about in the same plane as the edge of the hopper opening, the diameter of the bell in said plane being such as to leave a space for the downward feed of material from the magazine to the gas producer, and a discharge pipe connected to the bell.

6. In an apparatus for distilling carbonaceous material containing volatile material and a combustible residue, the combination, with a gas producer having a shaking grate, a closed ash-pit beneath the grate, and a magazine for lumps of material above the gas producer and arranged to feed thereto the carbonaceous material to be distilled, said magazine having a charging opening with a closure therefor, of means at the upper part of the gas producer for leading off gases and vapors, a conduit for supplying compressed air to the gas producer beneath the grate thereof, means for controlling the conduit to regulate the amount of air supplied, controllable means for directing inert gas below the grate at the point of entrance of the compressed air to form a preformed mixture of air and inert gas, and a source of inert gas supply connected to said controllable means.

7. In an apparatus for distilling carbonaceous material containing volatile material and a combustible residue, the combination, with a gas producer having a shaking grate, a closed ash-pit located beneath the grate, and a magazine for lumps of material above the gas producer and arranged to feed thereto the carbonaceous material to be distilled, said magazine having a charging opening with a closure therefor, of means at the upper part of the gas producer for leading off gases and vapors, a condenser in communication with said means, a furnace into which gases pass from said condenser, means for conducting inert gases from said furnace beneath the grate, a conduit for supplying air beneath the grate in close proximity to the point of entrance of the inert gases to insure a mixing of the air and inert gas, and means for separately regulating the air and gas supply to control the proportions of the mixture and the rate of admission thereof to the gas producer.

8. In an apparatus for distilling carbonaceous material containing volatile material and a combustible residue, the combination, with a gas producer having a shaking grate, a closed ash-pit located beneath the grate, and a magazine for lumps of material above the gas producer and arranged to feed thereto the carbonaceous material to be distilled, said magazine having a charging opening with a closure therefor, of means at the upper part of the gas producer for leading off gases and vapors, a condenser in communication with said means, means for conducting inert gases only from said condenser beneath the grate, a conduit for supplying air beneath the grate in close proximity to the point of entrance of the inert gases to insure a mixing of the air and inert gas, means for separately regulating the air and gas supply to control the proportions of the mixture and the rate of admission thereof to the gas producer, and means for conducting away surplus gases from the top of the magazine.

9. In an apparatus for distilling carbonaceous material, the combination, with a gas producer having a shaking grate, a closed ash-pit beneath the grate, arranged to provide a distributing space between the grate and the ashes, and a magazine for lumps of material above the gas producer and arranged to feed said material thereto, said magazine having a charging opening with a closure, of means at the upper part of the gas producer for leading off gases and vapors, a condenser in communication with said means and arranged to condense the vapors, a furnace into which gases pass from said condenser, means for conducting inert gases from said furnace to the distributing space of the ash-pit, means for admitting air with said gases and means for separately regulating the admission of air and of gas to control the proportions of the mixture and the rate of admission thereof to the gas producer.

ROBERT M. CATLIN.